United States Patent
Curzio et al.

(10) Patent No.: US 6,229,933 B1
(45) Date of Patent: May 8, 2001

(54) COMPONENT FOR CROSS-CONNECTING OPTOFIBRES

(75) Inventors: Peter Lo Curzio, Älvsjo; Johan Ander, Bromma; Erik Bergqvist, Bergsjö, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/485,994
(22) PCT Filed: Aug. 18, 1998
(86) PCT No.: PCT/SE98/01480
§ 371 Date: May 18, 2000
§ 102(e) Date: May 18, 2000
(87) PCT Pub. No.: WO99/13367
PCT Pub. Date: Mar. 18, 1999

(30) Foreign Application Priority Data

Aug. 22, 1997 (SE) .................................... 9703038

(51) Int. Cl.[7] .................................................. G02B 6/26
(52) U.S. Cl. ................................. 385/17; 385/16
(58) Field of Search .................. 385/15, 16, 17–24, 385/89

(56) References Cited

U.S. PATENT DOCUMENTS 5,155,785 * 10/1992 Holland et al. ........................ 385/89

FOREIGN PATENT DOCUMENTS 435 467   7/1991   (EP) .
587 336   3/1994   (EP) .

* cited by examiner

Primary Examiner—Phan T. H. Palmer
(74) Attorney, Agent, or Firm—Burns, Doane, Swecker & Mathis, L.L.P.

(57) ABSTRACT

To simplify handling of optofiber ribbons, there is provided a component for cross-connecting optofibers between different fiber ribbons, where the component pre se cross-connects optofibers between different fiber ribbons connected to the component. The component enables a fiber ribbon structure to be retained and undivided, even after cross-connecting or otherwise reorganizing the optofibers in one or more fiber ribbons. The cross-connecting components generally consist of a plastic casing (6,7) which surrounds optofibers (2) cross-connected or reorganized in a mixing zone or weave zone (5) and also the free optofiber-ends connected to the optofibers in the plastic casing on a component input side and a component output side respectively.

10 Claims, 4 Drawing Sheets

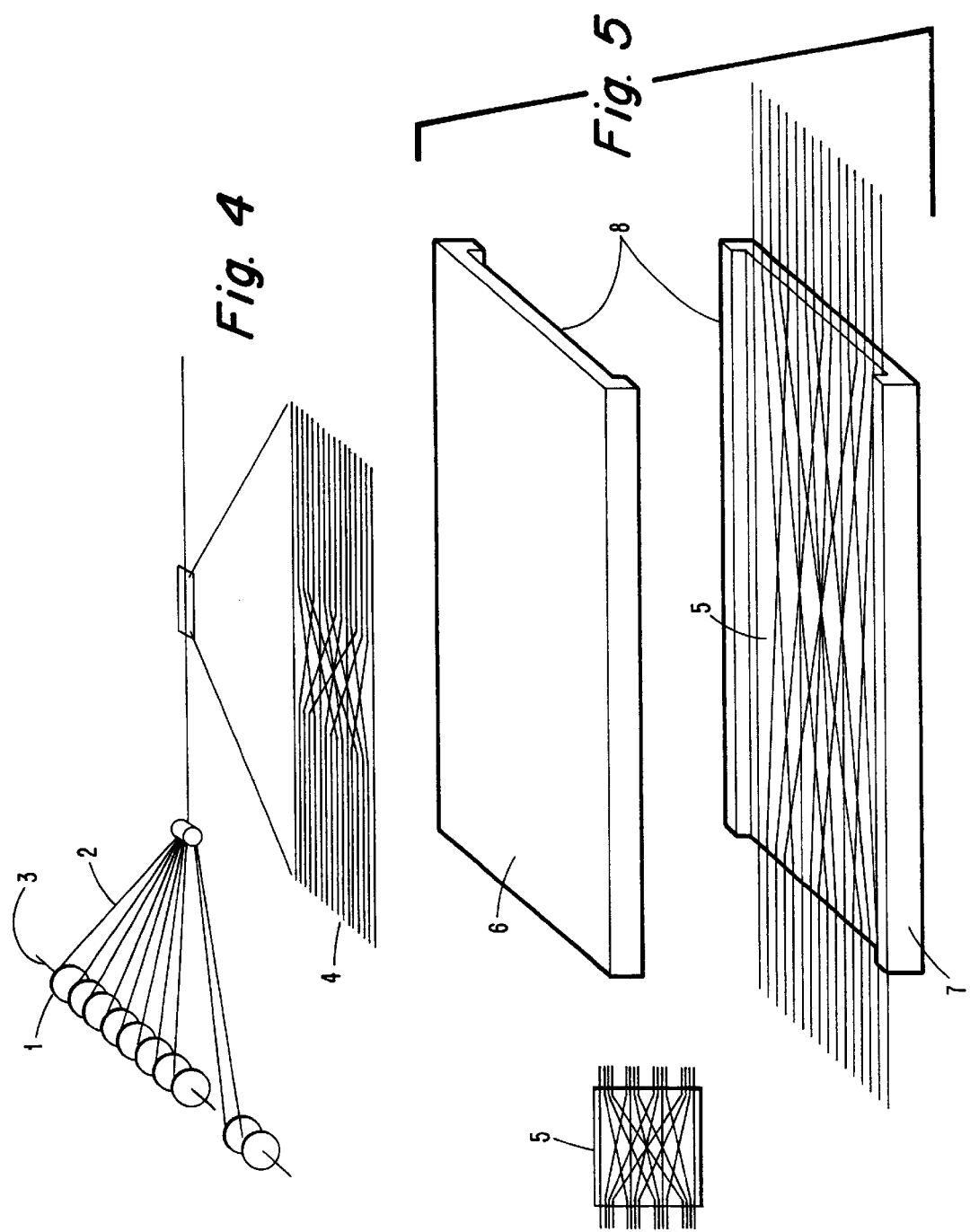

COMPONENT FOR CROSS-CONNECTING OPTOFIBRES

FIELD OF INVENTION

The present invention relates to a component for cross-connecting optofibres, preferably for permanently cross-connecting optofibres, with which component optofibres arranged in one or more optofibre ribbons can be cross-connected directly with optofibres in one or more other optofibre ribbons.

BACKGROUND OF THE INVENTION

EP 0 587 336 A2 teaches an electronic system that includes a plurality of printed circuit boards that are connected with optofibre ribbons and a pair of optical back planes. In this known system, the optical back planes include cross-connected optofibres which connect mutually opposite outputs and inputs on the back plane. The optofibres are also fastened to a flexible substrate with the aid of an adhesive material. EP 0 435 467 A2 teaches a fibreoptic network that includes optofibre ribbons, where the optofibres in said ribbons connect transmitters and receivers in nodes.

SUMMARY OF THE INVENTION

With the intention of simplifying the handling of optofibre ribbons, there is provided a component for cross-connecting optofibres between different fibre ribbons, where the component itself cross-connects optofibres between different fibre ribbons connected to the component. The inventive component enables a fibre ribbon structure to be kept undivided, even after a cross-connection or some other reorganisation of the optofibres in one or more fibre ribbons.

The cross-connecting component may comprise generally a plastic casing that surrounds cross-connected or reorganized optofibres and also the free ends of optofibre ribbons connected to the optofibres in the plastic casing on an input side and an output side of the component respectively. These ribbon ends can then be joined to fibre ribbons connected to the component, so as to obtain a cross-connection or reorganisation of the optofibres between the connected ribbons.

The use of fibre ribbons in combination with ribbon welding and multifibre contacts greatly facilitates the installation of fibreoptic networks. This is particularly important in access networks, where cost decides where the optical fibre can be drawn all the way to the subscriber's home (FTTH, Fiber To The Home). It is therefore desirable to be able to keep the fibre ribbon intact, even when cross-connecting or effecting some other reorganisation of the optofibres.

The use of a fibre-ribbon cross-connecting component is beneficial in respect, e.g., of cross-connecting signals from transmitter and receiver arrays on an electronic board or card—see FIG. 1—cross-connecting a plurality of fibre ribbons that contain different traffic flows—see FIG. 2—and branching-off? an undivided fibre ribbon in ring network structures in a so-called mixer—see FIG. 3.

The invention will now be described in more detail with reference to preferred exemplifying embodiments thereof and also with reference to the accompanying drawings.

BRIEF DESCRIPTION OF THE DRAWINGS

FIG. 4 is a simplified illustration of the manufacture of an inventive cross-connecting component.

FIG. 5 is a simplified illustration of an inventive cross-connecting component having outwardly protruding fibre-ribbon ends for connection with adjacent fibre ribbons.

DETAILED DESCRIPTION OF PREFERRED EMBODIMENTS

The process of producing an inventive cross-connecting component is commenced from a chosen number of drums or reels 1 (see FIG. 4) that carry coloured primary-coated single fibres 2 on a horizontal axle 3. The fibres included in a fibre ribbon are always coloured, for instance red, blue, white, green, so as to be readily identified. The fibres carried by the drums will preferably also be coloured in accordance with a similar system for the same reason.

Figure 1:
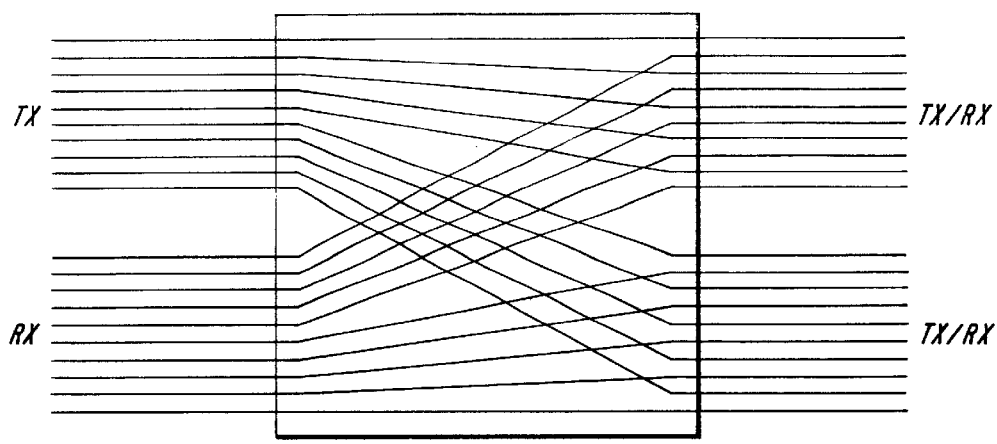
FIG. 1 illustrates the cross-connection of transmitter/receiver signals.
Figure 2:
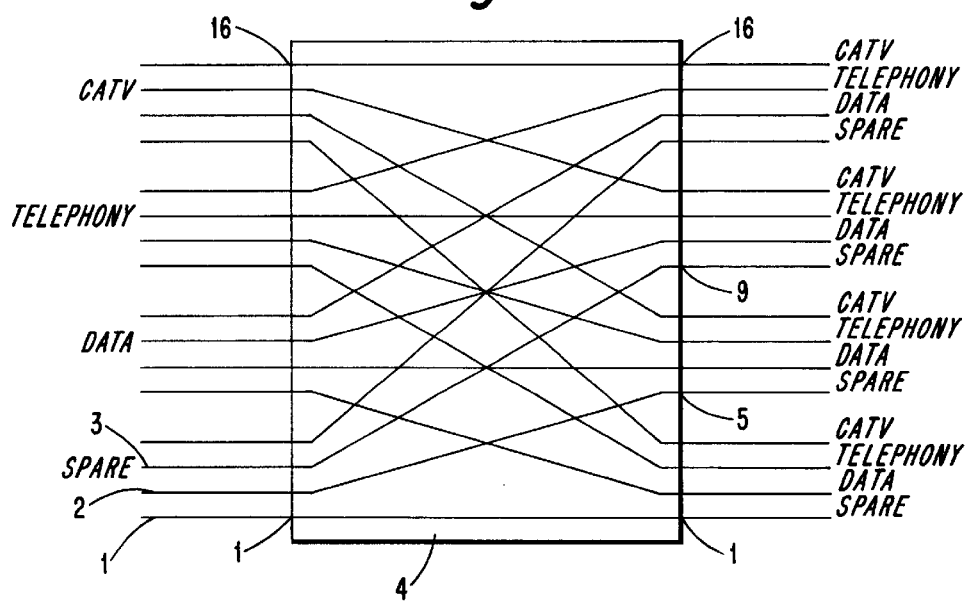
FIG. 2 illustrates the cross-connection of different traffic flows between fibre ribbons.
Figure 3:
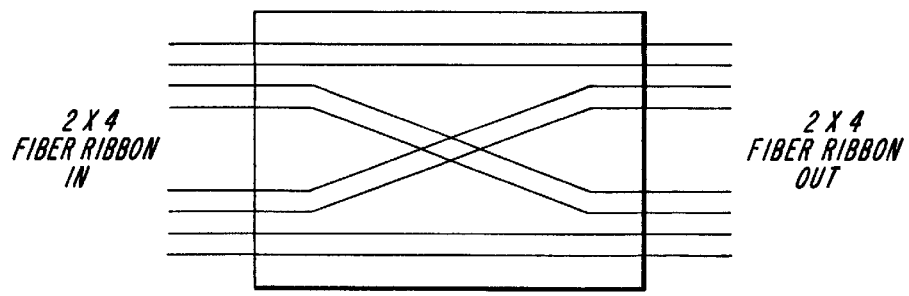
FIG. 3 illustrates a mixer for branching-off fibre ribbons in ring network structures.

The fibres are organised to provide the desired cross-connecting structure, for instance by positioning the fibres in a fibre organiser 4 as illustrated in FIG. 2. Fibre 1 is taken from the first drum and placed in position 1 on the left side of the fibre organiser and in position 1 on the right side of said organiser. Fibre 2 is placed in positions 2 and 5 respectively. Fibre 3 is placed in positions 3 and 9 respectively. Remaining fibres are placed in a similar fashion, so as to obtain the desired structure as shown in FIG. 2.

The fibres are organised by reeling-off the fibres to desired lengths and securing the fibre-ends to obtain a ribbon construction. Both sides closest to the fibre organiser 4 are also fixated in a similar fashion. The loose fibres are then "ribbonized" on both sides of the fibre organiser with some type of glue, silicone, adhesive tape, alcrylate or some like means.

The now ribbonized fibres are lifted finally from the fibre organiser 4 and the formed cross-connecting zone, the so-called mixing point or weave zone 5, can be encapsulated between two sleeves 6 and 7 filled with elastic material 8, such as plastic foam, acrylate, silicone or like material; see FIG. 5. The sleeves may, for instance, be fastened and joined together with adhesive tape.

Alternatively, a starting point can be taken from one or more undivided fibre ribbons which are branched out into individual fibres along half their lengths and the ends of the individual fibres organised and then re-ribbonized.

Figure 6:
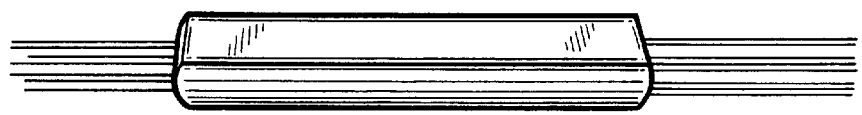
FIG. 6 illustrates one embodiment of an inventive cross-connecting component.
Figure 7:
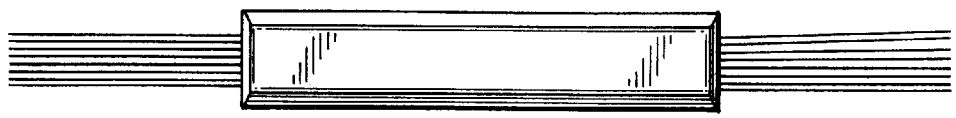
FIG. 7 illustrates the cross-connecting component in FIG. 6 from above.

Depending on the number of fibres that have been organised, the input and output fibres are now ribbonized as ribbons that contain 8 fibres, 12 fibres, 16 fibres or 24 fibres. These ribbons can then be divided into desired ribbon structures. FIGS. 6 and 7 show an example of a finished cross-connecting component. Multifibre contact devices can then be fitted to the free ends of the fibres, for instance an MT-device. Alternatively, ribbon-welding can be used to connect the component.

Figure 8:
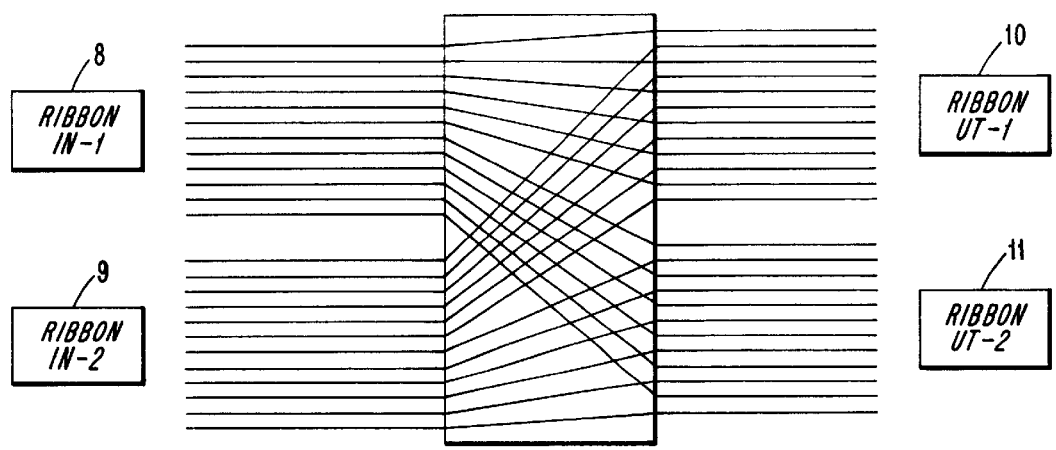
FIG. 8 illustrates the principle of a cross-connection for an inventive cross-connecting component.

The use of cross-connecting components enables significant savings in space to be made. A conceivable cross-connector variant is one in which the input is comprised of two 12-fibre ribbons 8 and 9 that are divided similarly into two 12-fibre ribbons 10 and 11 in which the fibres arrive alternately from one and the other of respective component ribbons. If one of the two component ribbons is connected solely to a transmitter and the other solely to a receiver, the output fibres of the ribbons will be connected either to a transmitter or to a receiver; see FIG. 8.

The starting material from which the cross-connector is formed may, for instance, consist of two 12-fibre ribbons that have been stripped up to the "mixing point", which may have the form of a weave zone in which the fibres in the component are mixed and then become free or are joined to two new ribbons, for instance with adhesive tape. The mixing point can then be protected, for instance, with embracing adhesive tape or with a plastic sleeve, and the ribbon provided with electric contacts, for instance, on an input side of the input ribbon with MT-devices and on an output side of the output ribbon with MPO-contacts. With respect to effective handling, the free ribbon lengths may be about 200 mm as measured from the electric contacts to the protective sleeve. Either the mixing point or the casing around the mixing point may be marked, to enable the mixing point to be identified.

Figure 9:
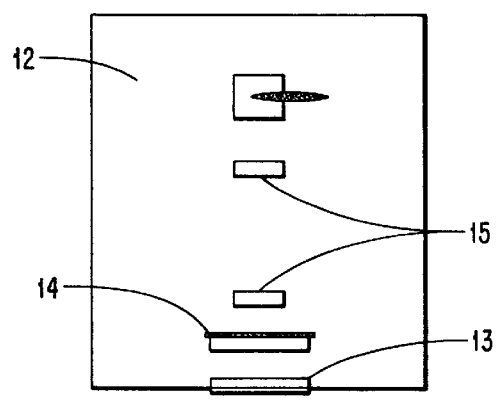
FIG. 9 illustrates a mounting plate for an inventive cross-connecting component.

When manufacturing a cross-connection component, there can be used a plate 12 on which a plurality of simple aids are mounted; see FIG. 9. A ribbon having a length of about 800 mm is stripped along half of its length and the fibres carefully cleaned so that no residues of matrix material remain. A ribbon is then fastened in a ribbon holder 13 and the fibres disposed in each alternate groove in a comb 14. A second ribbon is fastened on top of the first ribbon in a holder and the fibres of said ribbon disposed in the grooves between the fibres of the first ribbon. A collecting clip 15 is then fastened over the fibres close to the comb, so that their mutual positions can be secured and moved towards a mixing point. A second clip is fastened in a similar manner over the fibres adjacent? the comb The comb is then removed and replaced with a simple attachment with, e.g., double-sided adhesive tape, with which is the fibres are fastened while seated close together, as in the case of two ribbons. Matrix material is then applied to bind the fibres together and form a single ribbon, whereafter a material curing process can be commenced with the aid of UV-radiation. When curing, or hardening, is complete, the cross-connector can be carefully removed from the mounting plate and placed in a jig, to enable a plastic guard to be fitted with silicone rubber to form the actual cross-connecting component. The free ribbon-ends of the component are cut to correct lengths and provided with electric contacts, such as MT-ferrules on the original ribbon and MPO-contacts on the handmade ribbon-ends.

It will be understood that the invention is not restricted to the aforedescribed and illustrated exemplifying embodiments thereof and that modifications can be made within the scope of the accompanying Claims.

What is claimed is:

1. A component for cross-connecting optofibres, said component enabling optofibres disposed in optofibre ribbons to be directly cross-connected or reorganized, the component comprising:

a mixing point or weave zone adapted for organizing several cross-connected or re-organized optofibres; an input side and an output side before and after the mixing point or weave zone, wherein the optofibres on said input side and said output side are free for connection to optofibre ribbons, wherein said component can be connected to externally lying optofibre ribbons.

2. A component according to claim 1, wherein the mixing point or the weave zone is embraced by a casing.

3. A component according to claim 2, wherein the casing is comprised of two sleeve-like parts.

4. A component according to claim 3, wherein the sleeve-like parts are joined together.

5. A component according to claim 4, wherein the sleeve-like parts are joined by adhesive tape.

6. A component according to claim 3, wherein the sleeve-like parts are coated with an elastic material on their inner surfaces.

7. A component according to claim 2, wherein the mixing point, weave zone or casing is provided with a marking.

8. A component according to claim 1, wherein the optofibres on the input side and the output side are brought together as optofibre ribbons and ribbonized, thereby enabling the component to be connected readily to external optofibre ribbons and to retain an optofibre ribbon structure.

9. A component according to claim 8, wherein the optofibres on the input side and on the output side are held together with adhesive tape to form an optofibre ribbon.

10. A component according to claim 1, wherein the optofibres on the input side and on the output side are held together with adhesive tape to form an optofibre ribbon.

* * * * *